July 5, 1966 J. PARSTORFER 3,259,804

ELECTRICAL MODULE WITH MEANS FOR DISSIPATING HEAT

Filed April 26, 1962 2 Sheets-Sheet 1

INVENTOR.
JOHN PARSTORFER

BY Samuel Kane
ATTORNEY

ELECTRICAL MODULE WITH MEANS FOR DISSIPATING HEAT

Filed April 26, 1962 2 Sheets-Sheet 2

INVENTOR.
JOHN PARSTORFER
BY Samuel Kane
ATTORNEY 3,259,804

ELECTRICAL MODULE WITH MEANS FOR DISSIPATING HEAT

John Parstorfer, Philadelphia, Pa., assignor to Burroughs Corporation, Detroit, Mich., a corporation of Michigan
Filed Apr. 26, 1962, Ser. No. 190,442
9 Claims. (Cl. 317—100)

This invention relates generally to electrical and electronic apparatus and more particularly to plug-in modules and means for dissipating heat generated by the electrical components contained in such modules. While the invention is not limited thereto, it finds special utility in the fabrication of electronic computers and, particularly, in the construction of electrical network assemblies of the kind disclosed and claimed in a copending application of John Parstorfer and Edgar O. Sprude, Serial No. 15,920, filed March 18, 1960, and assigned to the same assignee as the present invention and now issued as Patent No. 3,227,926.

In the development of electronic apparatus, particularly in the computer field, considerable effort has been devoted to the development of high density packaging and miniaturization techniques whereby the size of computers and similar equipment may be reduced. These objectives have been difficult to attain because of the problems involved in maintenance and servicing of the tightly packaged individual components and in keeping their operating temperatures within required limits.

An object of the invention is the provision of an improved structure for packaging electrical components which will overcome the above-mentioned problems in a most reliable and efficient manner.

Another object of the invention is the provision of an electrical module which is easy to service and maintain.

A further object of the invention is the provision of an electrical plug-in module of subminiaturized design with means for cooling, during operation, the electrical components contained in the module.

Still a further object of the invention is the provision of a heat dissipating structure for tightly packaged electrical modules and the like, characterized by the negligible amount of space required for its mounting.

Another object of the invention is the provision of a cooling structure which may be assembled and disassembled in a most rapid and simple manner and, in either case, without disturbing any of the electrical components associated with the module.

A further object of the invention is the provision of a cooling structure for a package of electrical unit assemblies which allows the use of liberal tolerances in the manufacture of these unit assemblies so that the final assembly of the package is greatly facilitated.

In accordance with the above objects and considered first in its broad aspects, the invention comprises a plug-in electrical module of novel design in the form of a box-like container, which is provided with a bottom panel carrying electrical conductors thereon for making connections between electrical components inside the container and electrical contacts outside the container. The electrical components are arranged in similarly shaped block-like unit assemblies and are electrically connected to the panel conductors. The electrical unit assemblies are distributed in the interior of the module container in such manner that any one unit assembly can be removed readily, for example, for servicing, without disturbing other electrical unit assemblies. A heat conductive fin structure is intimately associated with the electrical unit assemblies to radiate and dissipate heat to the outside of the module container, such heat being generated under operating conditions by the electrical components.

The invention will be more clearly understood when the following detailed description of the preferred embodiment thereof is read in conjunction with the accompanying drawings in which.

Turning now to the drawings, the illustrated embodiment of the invention comprises a contact frame assembly 10 (FIG. 6), a plurality of block-like electrical unit assemblies 12 secured to a panel 14 of electrically insulating material, and a heat conductive structure 16 for dissipating heat generated in the electrical unit assemblies 12.

Figure 8:
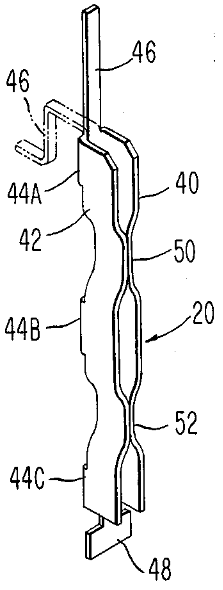
FIG. 8 is an enlarged isometric view of a spring contact member.

The contact frame assembly 10 includes a contact frame 18 of electrically insulating material and a plurality of electrically conductive spring contacts 20, the latter seen most clearly in FIG. 8. The contact frame 18 is of open rectangular construction and has left and right end wall members 22 and 24 and front and rear side wall members 26 and 28. The external faces of the side walls 26 and 28 are formed with spaced rectangular slots 30 extending from top to bottom in which are received the spring contacts 20. On the end wall 22 adjacent to side wall 26 is a projecting elongated ridge 32, and in the end wall 24 adjacent to side wall 26 is an elongated step or recess 34. When the electrical module structure is plugged into a receptacle of associated apparatus, which may be, for example, of the kind disclosed in the aforementioned patent of John Parstorfer and Edgar O. Sprude, the ridge 32 and recess 34 orient the module in the receptacle and thus assure that it will be inserted correctly.

Figure 7:
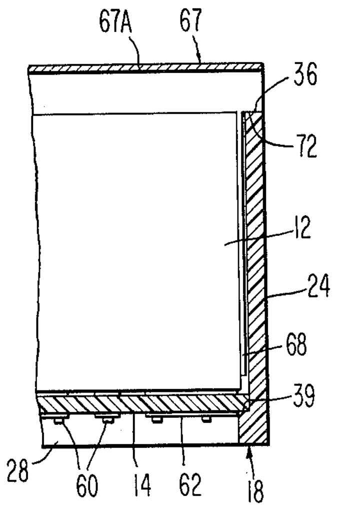
FIG. 7 is an enlarged fragmentary sectional view taken along line 7—7 of FIG. 1.

The top surface 36 of the contact frame 18 is formed with two notches 38 which extend from one end of the module to the other, each adjacent to one of the side walls 26 and 28. Inside the contact frame 18, and preferably formed as integral parts of the end walls 22 and 24, are positioning or stop means in the form of shoulders 39, only one of which is shown (see also FIG. 7).

The spring contacts 20 (FIG. 8) have a channel-like formation comprising lateral flanges 40 and 42 extending from spaced central rib portions 44A, 44B and 44C. A terminal tab 46 and an anchoring lug 48 extend from the central rib portions 44A and 44C, respectively. Between the ribs, the flanges 40 and 42 are deformed or dimpled, as at 50 and 52, to bring their confronting faces close together, or into contact with each other.

Figures 1, 2, 3, 4, 5:
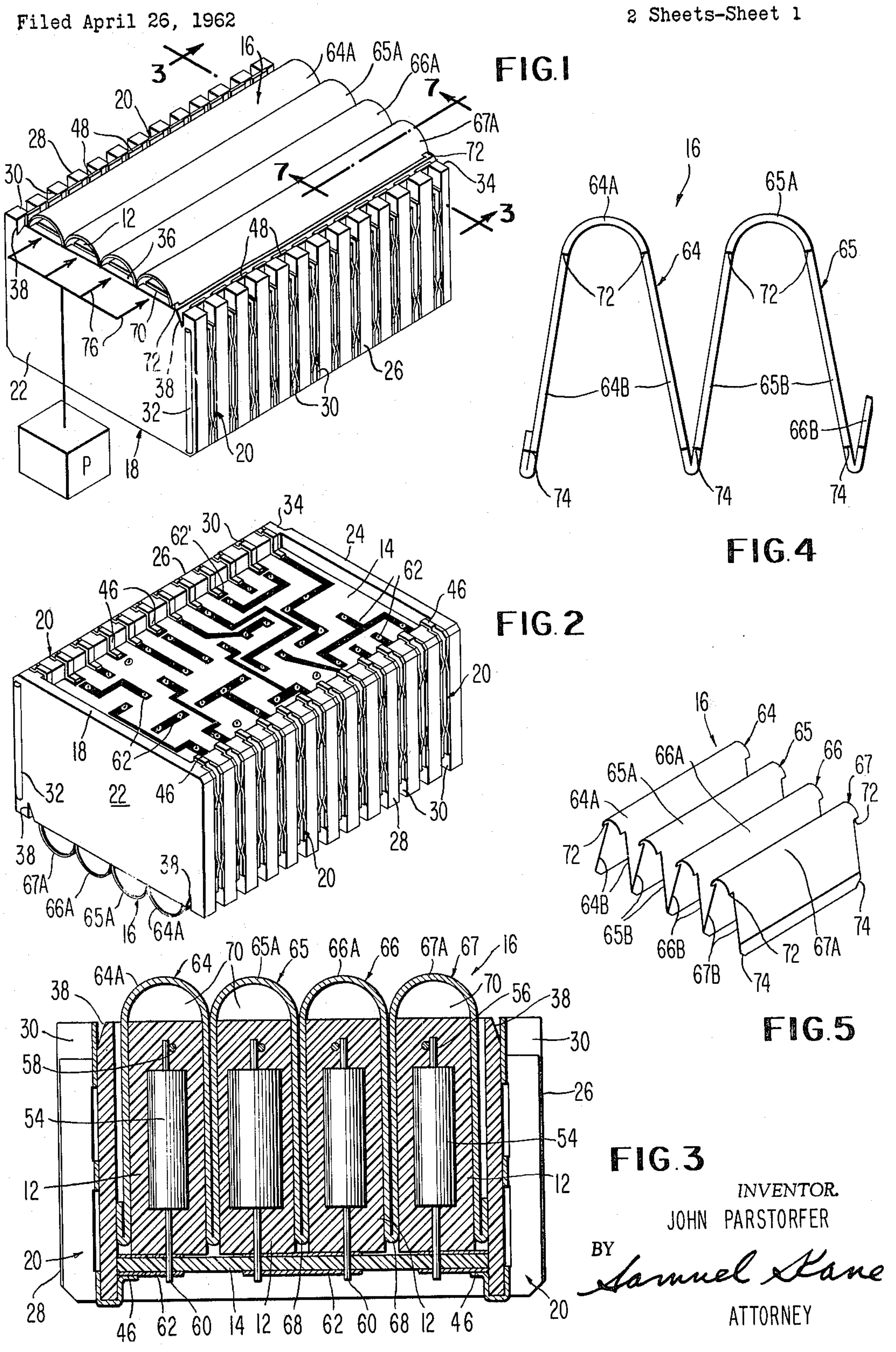
FIG. 1 is an isometric view of an electrical plug-in module constructed in accordance with the invention.
FIG. 2 is an inverted view of the module shown in FIG. 1.
FIG. 3 is an enlarged sectional view taken along line 3—3 of FIG. 1.
FIG. 4 shows a fragment of the heat conductive fin structure in disassembled condition.
FIG. 5 is an isometric view on a reduced scale of the heat conductive fin structure in disassembled condition.

The electrical unit assemblies 12 (FIG. 6) are formed of electrically insulating material and each houses or encapsulates one or more electrical components 54 (FIG. 3) which may be, for example, resistors, diodes, capacitors, transistors, etc. The electrical components 54 are electrically connected within each electrical unit assembly 12 by having their upper lead wires 56 appropriately connected by jumper wires 58. The lower lead wires 60 of the electrical components 54 extend through openings in the panel 14 and are soldered or otherwise electrically connected to conductors 62 (see also FIG. 2) supported on the outer surface of the panel 14. As shown in FIG. 2, the panel 14 is preferably of the printed circuit type, with the conductors 62 forming the printed circuitry thereon.

In one mode of assembly, the printed circuit panel 14, together with the electrical unit assemblies 12 soldered or otherwise bonded thereto in equally-spaced-apart relation (FIG. 6), is lowered broadwise into the contact frame 18 and positioned on the stop shoulders 39, and cemented or otherwise bonded thereto. The spring contacts 20 are next inverted from the position shown in FIG. 8 to that shown in FIG. 6 and then placed into the slots 30 with the anchor lugs 48 positioned in the notches 38. The terminal tabs 46 are then bent inwardly (FIGS. 2 and 3) and soldered or otherwise bonded to the printed circuit conductors 62. In any case where a spring contact 20 is not used in circuit, its tab 46 is soldered to a printed circuit type pad 62'.

The heat conductive structure 16 is preferably made of a single strip of flexible material such as thin sheet copper, for example, and is formed into a laterally elastic zig-zag construction, as shown in FIGS. 4 and 5, by being bent and doubled back upon itself the required number of times. As viewed in these figures, the heat conductive structure 16 exhibits the appearance of a number of inverted U-shaped channels 64, 65, 66 and 67, the latter two channels not being shown in FIG. 4. The channels 64–67 are provided with hoods 64A–67A, respectively, from which depend diverging legs 64B–67B, respectively.

Figure 6:
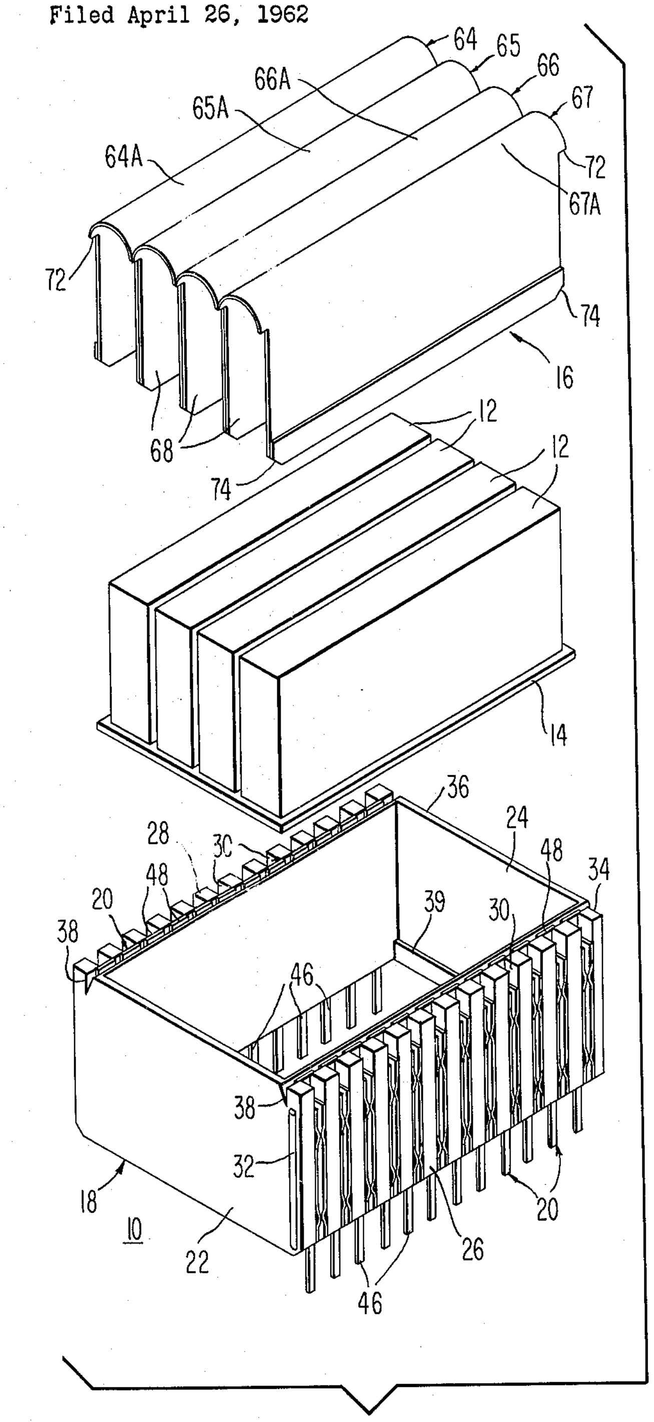
FIG. 6 is an exploded or separated view of the electrical module.

The heat conductive structure 16 is compressed manually to a condition similar to that shown in FIG. 6, and then inserted into the contact frame 18 with the legs 64B–67B slidably inserted between adjacent electrical unit assemblies 12 and between the endmost electrical unit assemblies 12 and the side walls 26 and 28 of the contact frame. It will now be perceived that, in the inserted condition (FIG. 3), the elastic heat conductive structure 16 attempts to return to its disassembled, expanded condition, shown in FIG. 4, and therefore presses against the electrical unit assemblies 12 and side walls 26 and 28 to provide a firm assembly inside the contact frame 18. As viewed in FIG. 3, the adjacent legs of adjacent U-shaped channels 64–67 are pressed together constituting double thickness heat conductive fins 68 (see also FIG. 6). Thus the heat conductive structure 16 is doubly effective for conducting heat from the electrical components 54 of adjacent electrical unit assemblies 12 to the hood structure 64A–67A, at which place the heat is radiated to the surroundings and to draft openings 70.

Each of the hoods 64A–67A is provided with stop shoulders 72 for limiting the depth to which the fins 68 may be inserted into the contact frame 18, and to establish the size of the draft openings 70. Chamfers 74 at the lower corners of the heat conductive structure 16 facilitate its insertion into the contact frame.

In certain applications, the unaided heat conductive structure 16 will satisfactorily dissipate heat generated by the electrical components 54, however, in other applications it may be desirable to provide auxiliary means for obtaining a flow of coolant fluid through the draft openings 70 and across the outer surface of the hoods 64A–67A. One such auxiliary device may take the form of a pump P, illustrated diagrammatically in FIG. 1, for forcing fluid, such as air for example, in the direction of the arrows 76 to provide a fluid flow through the draft openings 70 and over the hoods 64A–67A.

From the foregoing description, it will now be apparent that the invention provides a novel electrical module with a simplified structure for dissipating heat most efficiently. Maintenance and servicing of the module, for example, by replacing an electrical unit assembly 12, are accomplished easily and simply by pulling out the heat conductive structure 16 and de-soldering the electrical unit assembly from the printed circuit panel 14. A tool which will de-solder an electrical unit assembly in a matter of seconds without disturbing or overheating other electrical unit assemblies is preferably of the kind disclosed and claimed in a copending application of John Parstorfer, Serial No. 66,305, filed October 31, 1960, and assigned to the same assignee as the present invention and now issued as Patent No. 3,084,649.

While there has been disclosed a specific structure exemplary of the principles of the invention, it is to be understood that this is but one embodiment thereof and that the invention is capable of being constructed in a variety of shapes, sizes and modifications without departing from its true spirit and scope. Accordingly, it is to be understood that the invention is not to be limited by the specific structure disclosed, but only by the subjoined claims.

What is claimed is:

1. A plug-in electrical module structure comprising, a vertical frame having side and end wall members, spaced parallel spring contacts on the outside of said side wall members extending between the top and bottom of said frame, shoulder means inside said frame adjacent to the bottom thereof, a printed circuit panel having electrical conductors and being inserted broadwise into said frame and positioned on said shoulder means with the panel conductors in circuit with said spring contacts, a plurality of similarly shaped block-like electrical unit assemblies having substantially parallel major side surfaces and mounted on said printed circuit panel in equally-spaced-apart relation and substantially flush with the top of said frame, each electrical unit assembly containing heat generating electrical components electrically connected to said panel conductors, an elastic structure for dissipating heat generated by said electrical components comprising, heat conductive fins inserted into the spaces between said electrical unit assemblies, each fin being in contact with said major side surfaces of adjacent said electrical unit assemblies, and a plurality of heat conductive draft hoods at the top of and external to said frame and at the outside of said module structure and connected to said fins, one said draft hood over each electrical unit assembly, and means for forcing fluid coolant through said draft hoods, said elastic structure being compressed in a direction transverse to the direction of insertion of said fins in order to effect said insertion, and said draft hoods being constructed so that said coolant can contact said electrical unit assemblies.

2. A plug-in electrical module structure comprising, a vertical frame having side and end wall members, spaced contacts on the outside of said side wall members, means on said frame for orienting said module in a receptacle of associated apparatus, shoulder means inside said frame adjacent to the bottom thereof, a circuit panel having conductors thereon and being inserted broadwise into said frame and positioned on said shoulder means with the panel conductors in circuit with said spaced contacts, a plurality of similarly shaped block-like electrical unit assemblies having substantially parallel major side surfaces and mounted on said circuit panel in equally-spaced-apart relation and substantially flush with the top of said frame, each electrical unit assembly containing heat generating electrical components electrically connected to said panel conductors, and an elastic structure for dissipating heat generated by said electrical components comprising, heat conductive fins inserted into the spaces betwen said electrical unit assemblies, each fin being in contact with said major side surfaces of adjacent ones of said electrical unit assemblies, and a plurality of heat conductive draft hoods at the top of and external to said frame and at the outside of said module structure and connected to said fins, each said draft hood overlying one of said electrical unit assemblies, and said elastic structure being compressed in a direction transverse to the direction of insertion of said fins in order to effect said insertion.

3. An electrical module structure comprising, an open frame having side and end wall members, electrical contacts on the outside of said side wall members, a panel having conductors thereon and being inserted broadwise into said frame adjacent to one end thereof, a plurality of similarly shaped block-like electrical unit assemblies having substantially parallel major side surfaces and mounted on said panel in equally-spaced-apart relation and substantially flush with the other end of said frame, each electrical unit assembly containing heat generating electrical components electrically connected to said panel conductors, and an elastic structure for dissipating heat generated by said electrical components comprising, heat conductive fins inserted into the spaces between said electrical unit assemblies, each fin in contact with said major side surfaces of adjacent ones of said electrical unit assemblies, and a plurality of heat conductive draft hoods at said other end of and external to said frame and at the outside of said module structure and connected to said fins, each said draft hood overlying one of said electrical unit assemblies, and said elastic structure being compressed in a direction transverse to the direction of insertion of said fins in order to effect said insertion.

4. A plug-in electrical module structure comprising, an open frame having vertical side and end wall members, spaced parallel elongated contacts on the outside of at least one of said side wall members, a plurality of similarly shaped blocklike electrical unit assemblies having substantially parallel major side surfaces and mounted in said frame in equally-spaced-apart relation and substantially flush with one end of said frame, each electrical unit assembly containing heat generating electrical components electrically connected to said elongated contacts, and an elastic structure for dissipating heat generated by said electrical components comprising, heat conductive fins inserted into the spaces between said electrical unit assemblies, each fin contacting said major side surfaces of adjacent electrical unit assemblies, and a plurality of heat conductive draft hoods at said one end of and external to said frame and at the outside of said module structure and connected to said fins, each said draft hood overlying one of said electrical unit assemblies, and said elastic structure being compressed in a direction transverse to the direction of insertion of said fins in order to effect said insertion.

5. A plug-in electrical module comprising, an open frame having side and end wall members, spaced electrical contacts on the outside of said side wall members, a plurality of electrical unit assemblies having major side surfaces and mounted in said frame in spaced-apart relation and substantially flush with an open end of said frame, each electrical unit assembly containing heat generating electrical components electrically connected to said electrical contacts, and an elastic structure for dissipating heat generated by said electrical components comprising, heat conductive fins inserted into the spaces between said electrical unit assemblies, each fin being in contact with the said major side surface of at least one of said electrical unit assemblies, and at least one heat conductive draft hood at said open end of said frame and at the outside of said module and connected to said fins, each said draft hood overlying at least one of said electrical unit assemblies, and said elastic structure being compressed in a direction transverse to the direction of insertion of said fins in order to effect said insertion.

6. An electrical module comprising, a box-like container having side and end wall members and a bottom panel provided with electrical conductors on its outer surface, spaced parallel spring contacts on the outside of said side wall members extending between the top and bottom of said container and electrically connected to said panel conductors, a plurality of electrical unit assemblies having major side surfaces and mounted in said container on said bottom panel and substantially flush with the open end of the container, each electrical unit assembly containing heat generating electrical components electrically connected to said bottom panel conductors, and an elastic structure for dissipating heat generated by said electrical components comprising, self-locking heat conductive fins each removably inserted between adjacent ones of said electrical unit assemblies in heat-absorbing relation with a major side surface of each of said adjacent unit assemblies, and a hood structure external to the container and connected to said fins, said hood structure providing means for obtaining draft over said electrical unit assemblies, and said elastic structure being compressed in a direction transverse to the direction of insertion of said fins in order to effect said insertion.

7. The combination of an electrical plug-in module having a plurality of heat generating electrical unit assemblies arranged in spaced-apart relation, and an elastic structure for radiating heat generated by said electrical unit assemblies, said structure comprising, an elongated strip of flexible heat conductive material of predetermined thickness repeatedly doubled back upon itself in such manner as to provide a plurality of draft hoods one for each electrical unit assembly and at least one double-thickness normally expanded fin each inserted under compression into the space between two unit assemblies.

8. The combination of an electrical plug-in module having a plurality of heat generating electrical unit assemblies arranged in spaced-apart relation, and a structure for radiating heat generated by said electrical unit assemblies, said structure comprising, draft means for said electrical unit assemblies, and at least one compressible fin in heat conductive relation with said draft means, each fin being inserted under compression into the space between two unit assemblies and so constructed that when so inserted it tends to expand and presses said two unit assemblies in opposite directions.

9. The combination of an electrical plug-in module having a plurality of heat generating electrical unit assemblies arranged in spaced-apart relation, and a structure for radiating heat generated by said electrical unit assemblies, said structure comprising, a compressible elastic body having at least one heat conductive fin each of which is inserted into the space between adjacent unit assemblies, and means carried by said elastic body and external to said module for conducting heat away from said fins, and wherein said elastic body is compressed in a direction transverse to the direction of insertion of said fins in order to effect said insertion.

References Cited by the Examiner

UNITED STATES PATENTS

| | | | |
|---|---|---|---|
| 2,772,382 | 11/1956 | Escoffery | 317—234 |
| 2,883,591 | 4/1959 | Camp | 317—234 |
| 3,065,384 | 11/1962 | Sprude | 317—101 |
| 3,070,729 | 12/1962 | Heidler | 317—100 |

OTHER REFERENCES

Electronic Design, March 16, 1960, pp. 126–127.
Electronic Design, Nov. 9, 1960, page 90.

KATHLEEN H. CLAFFY, *Primary Examiner.*

E. JAMES SAX, *Examiner.*

J. G. COBB, H. J. RICHMAN, *Assistant Examiners.*